United States Patent
Putzolu

(12) 
(10) Patent No.: US 6,359,902 B1
(45) Date of Patent: Mar. 19, 2002

(54) SYSTEM FOR TRANSLATION AND DELIVERY OF MULTIMEDIA STREAMS

(75) Inventor: David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/136,326

(22) Filed: Aug. 18, 1998

(51) Int. Cl.⁷ .................................................. H04J 3/16

(52) U.S. Cl. ...................................... 370/466; 370/467

(58) Field of Search ............................... 370/397, 466, 370/467; 709/247

(56) References Cited

U.S. PATENT DOCUMENTS 5,418,780 A * 5/1995 Henrion ........................ 370/397
5,621,660 A * 4/1997 Chaddha et al. ............ 709/247

OTHER PUBLICATIONS

"Some Frequently Asked Questions about RTP," <http://www.cs.columbia.edu/~hgs/rtp/faq.html>, last modified on Aug. 7, 1997.

Schulzrinne, et al., "RTP: A Transport Protocol for Real–Time Applications," RFC 1889, Network Working Group, dated Jan. 1996.

Handley et al., "SDP: Session Description Protocol," Internet–Draft, Internet Engineering Task Force, dated Nov. 21, 1997.

* cited by examiner

Primary Examiner—Salvatore Cangialosi
(74) Attorney, Agent, or Firm—Kenyon & Kenyon

(57) ABSTRACT

A multicast transmission gating system is provided as a gateway for reception of multicast transmissions for various multicast groups from a public network to a private network having a number of clients. The gating system provides transcoding capability to provide real-time sub-groups to the private network and provides control of access by network clients to prevent bandwidth conflicts and dissemination of secure information. Firewall capabilities are also supported to prevent security breaches of the private network via the multicast facilities of the public network.

36 Claims, 13 Drawing Sheets

SYSTEM FOR TRANSLATION AND DELIVERY OF MULTIMEDIA STREAMS

BACKGROUND INFORMATION

The capabilities of the Internet for dissemination of data to and from various points on the Internet network are well established. For example, during point-to-point ("unicast") communications over the Internet, a source workstation identified by a unique Internet address ("IP address") attempts to transmit data to a single destination workstation, identified by a unique destination IP address. The path traveled by the data over the network to reach the destination is determined based on network "nodes"—e.g., routers physically implemented in the network to transmit data. FIG. 1 illustrates a portion of a network 10 connecting a source workstation 12 and a destination workstation 20 for point-to-point communication. In this example, network nodes 14 establish a path 16 (denoted by arced vectors) for transmission of data between each workstation.

The Internet may also be used for dissemination of data from a single source to multiple destinations by what has been termed "multicasting." For example, a presentation at a particular location can be converted (via camera and microphone) into video and audio data streams, and the video and audio data may then be communicated over the network to various destination workstations at remote locations. Presently, the Internet includes facilities within the network to facilitate such multicast transmissions of data from a single source to multiple destinations. Network nodes may include specific hardware/software to handle the routing of multicast transmission data. One example of such facilities is referred to as the "multicast backbone," or "MBONE." The MBONE permits data content (for example, audio and video data streams) to be routed over the Internet to multiple end-users which have "subscribed" to receive the data content. The network nodes operate to propagate the content to the correct end-user destinations.

FIG. 2 is a network diagram illustrating a portion of a network 30 implementing a prior art multicast transmission facility. A data source 32 is connected to the network 30 via a network node 40a (which is part of a collection of network nodes 40). Data source 32 provides a data stream, for example, digital video and audio signals produced by a camera and/or microphone used to record a presentation. Note that the data stream may be transmitted in compressed or otherwise encoded form in order to reduce the network bandwidth needed to transmit the data stream. For example, as depicted in FIG. 2, the data source 32 transmits the data stream containing digital audio compressed using the G.711 compression standard and having a bandwidth of approximately 8 Kbits/s, and digital video compressed using the H.261 compression standard and having a bandwidth of approximately 200 Kbits/s.

The data stream traverses the network 30 over paths 38 (as shown by the arced flow vectors). The node 40a coupled to the data source 32 is first to receive the multicast transmission data. The transmission from the data source 32 is identified as a multicast transmission, for example, by identifying the destination IP address for the transmission as an address that is specially allocated to indicate a multicast transmission. For example, as presently defined, multicast transmissions are indicated by "class D" destination IP addresses (in the IP address range 224.x.x.x to 229.x.x.x). Thus any data being sent to a destination IP address in this range will be recognized and treated as a multicast transmission.

Upon identification of the transmission as a multicast transmission, the node 40a accesses a database indicating the actual destination IP addresses for those end-users that have subscribed to receive the particular multicast transmission. Subscription may be achieved, for example, via messages using the Internet Group Management Protocol ("IGMP"), by an end-user sending an e-mail message to an appropriate authority to request inclusion in the multicast transmission table, or by other means. Once the destination addresses for those who have subscribed to the transmission have been resolved (in this example, end users 42) the node 40a replicates the data stream and transmits the data stream to those end-users 42 coupled to the node 40a. Furthermore, the node 40a routes the data stream to another node 40 for further replication and transmission to other end-users 42 who have subscribed to receive the multicast transmission. In this manner, the multicast transmission may traverse multiple paths 38, as shown in FIG. 2.

At any given time, several multicast transmissions may be in progress, the different multicast transmissions being distinguished, for example, by the different destination IP addresses that identify each transmission. Each multicast transmission may be described as a "multicast group" or "multicast channel." In order to allow users to select which multicast group to receive, a "Session Description Protocol" (SDP) message is sent over the network. The SDP message includes basic information about the multicast program, such as the title, time and location of various multicasts being provided over the network. The end-user may then "tune in" to the desired multicast group using the information provided by the SDP message. The SDP transmissions are typically low-bandwidth uncompressed messages which can be accessed by most contemporary workstations operating in conjunction with even low-bandwidth network connections.

Multicast facilities are particularly useful in transmitting "real-time" (i.e., live) audio/video signals to multiple end-users. This audio/video data may be transmitted, for example, using the "Real time Transport Protocol," also known as RTP. The RTP sets the format for transmitting data comprising multimedia (audio and/or video) or other signals over a network where real-time access is desired. For example, the RTP specifies the provision of packet numbering, timestamping, and other information about the data being transmitted that is useful for real-time data transmissions and reception. A more detailed description of RTP is given in Schulzrinne et al., "RTP: A Transport Protocol for Real-Time Applications," IETF Network Working Group RFC 1889, January 1996.

As part of the RTP, end-user workstations that receive an RTP transmission will respond periodically by transmitting an "RTCP" (Real-time Transport Control Protocol) message. The RTCP message is used for various functions, such as indicating who is "listening" to the multicast transmission, and how well the transmission is being received. A more detailed description of RTCP is also given in the aforementioned Schulzrinne et al. reference.

Traditional multicast transmissions (and, in particular, transmissions over the MBONE) pose several problems for end-users, and particularly end-users that are part of a private network (e.g., a corporate network). The end-user equipment or private network interconnections that provide access to the user equipment may be unable to accommodate the bandwidth or decompression processing requirements of multicast data streams, thus preventing proper reception. For example, it is common in corporate networks that not every end-user have the same computer equipment or the same network connection, particularly in large networks. Another problem for private networks is that the content being provided via the multicast facilities of the Internet is not restricted or filtered, and also, unwanted/undesirable multicast transmissions may be accessible by end-users. Such unregulated access may cause network bandwidth problems that can severely degrade all network service. Furthermore, because multicast transmissions are received from outside the private network, multicast transmissions can serve as an access point for illegal entry into private networks.

SUMMARY OF THE INVENTION

According to the present invention, a multicast transmission gating system may be implemented. The multicast transmission gating system comprises a receiver to receive a multicast transmission in a predetermined coding format from a first network, as well as a transcoder to generate an alternate format transmission by converting the multicast transmission from the predetermined coding format into an alternate coding format. Control logic is provided to determine the alternate coding format. The multicast transmission gating system further comprises a transmitter to transmit the alternate format transmission to a second network.

A further embodiment of the multicast transmission gating system may also include logic to control the transmission of the alternate format transmission to at least one client connected to the second network. A further embodiment may also include logic to generate a description message for the alternate format transmission and transmit the description message to the second network. A further embodiment may also include a receiver to receive a client message from at least one client connected to the second network, and logic to allow the second network transmitter to transmit the alternate format transmission upon receipt of the client message. A further embodiment may also include firewall logic to prevent unauthorized access to the second network.

DETAILED DESCRIPTION

Figure 1:
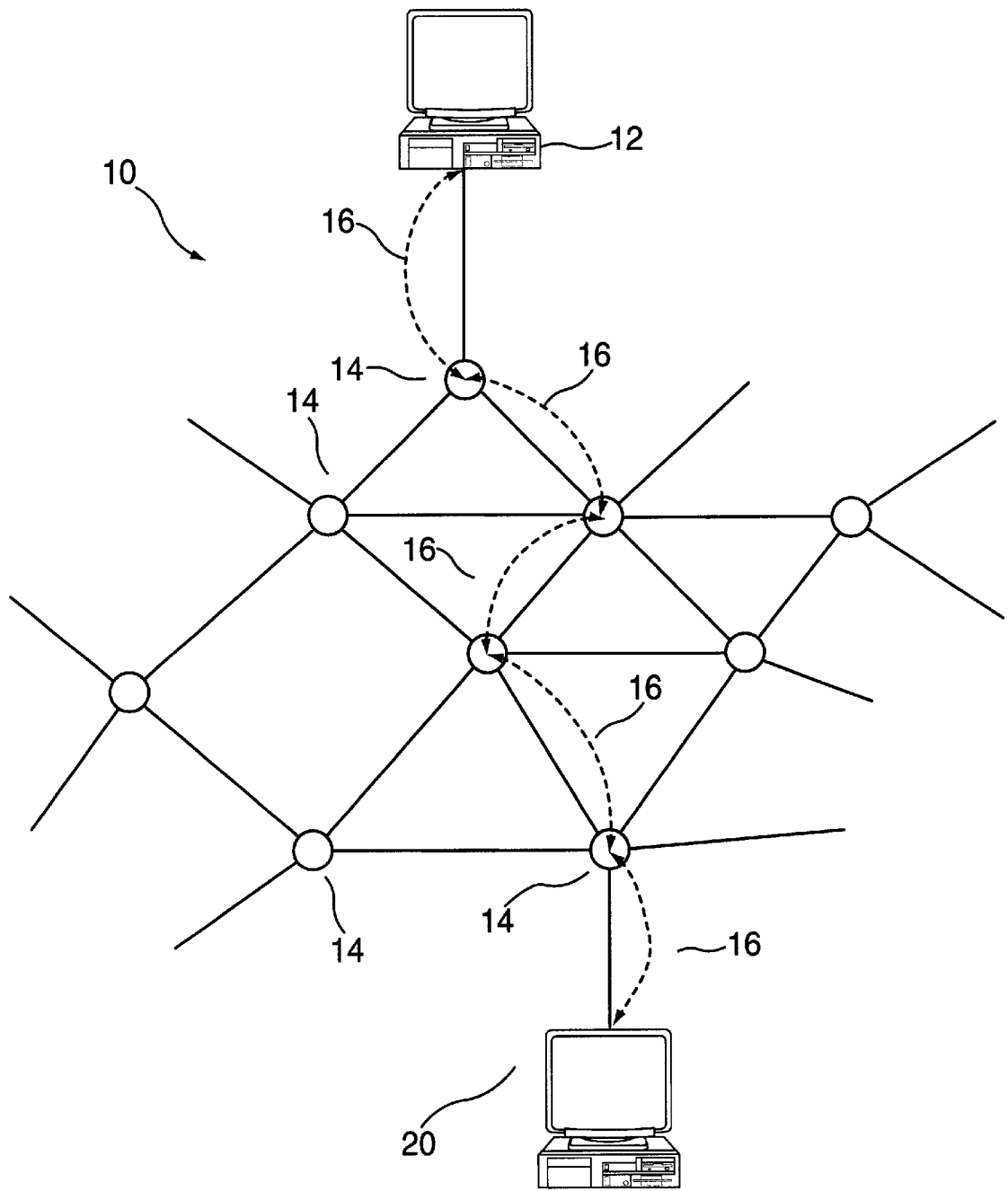
FIG. 1 shows a network diagram of a prior art public network.
Figure 2:
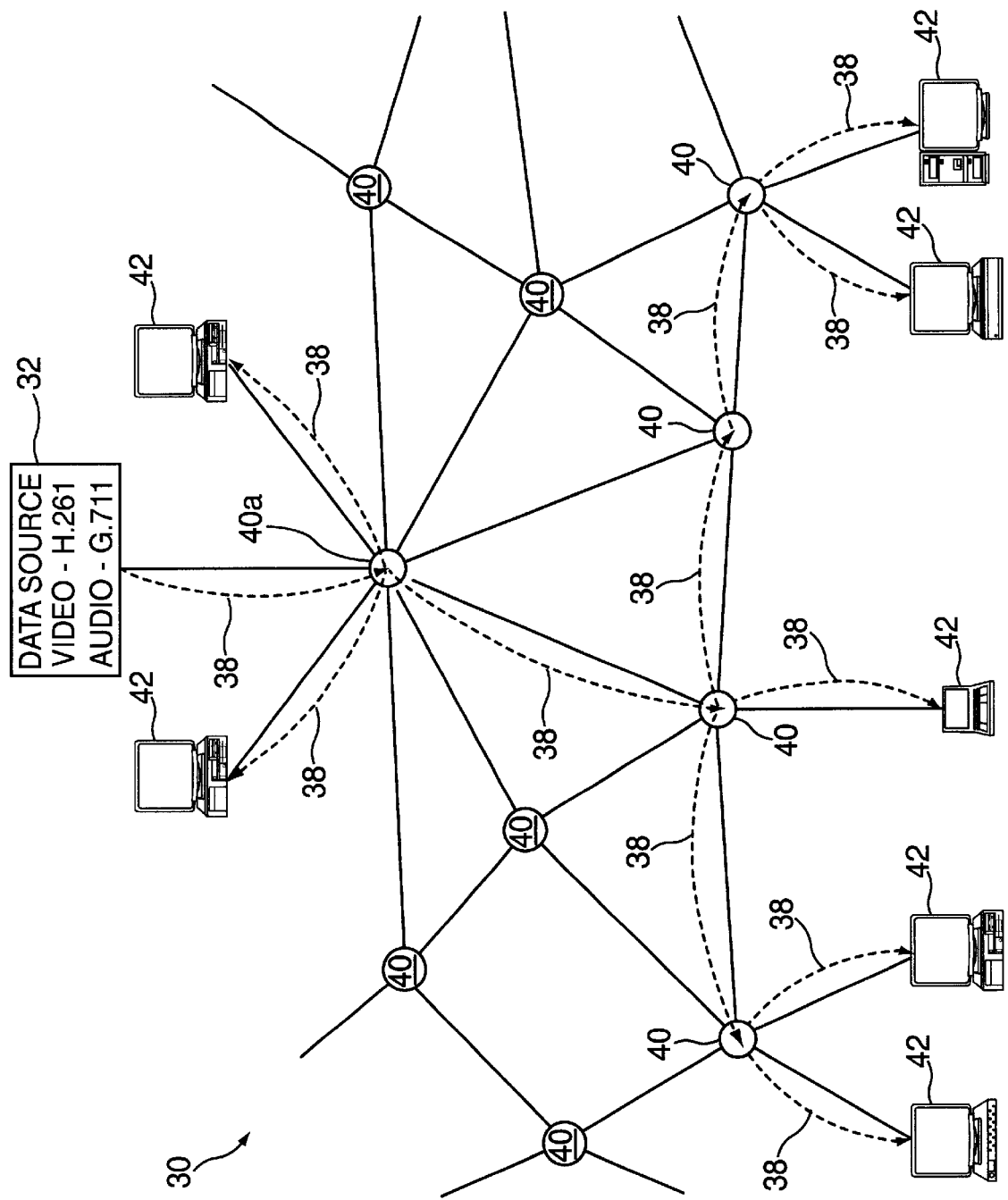
FIG. 2 shows a network diagram of a prior art public network with multicast facilities.
Figure 3:
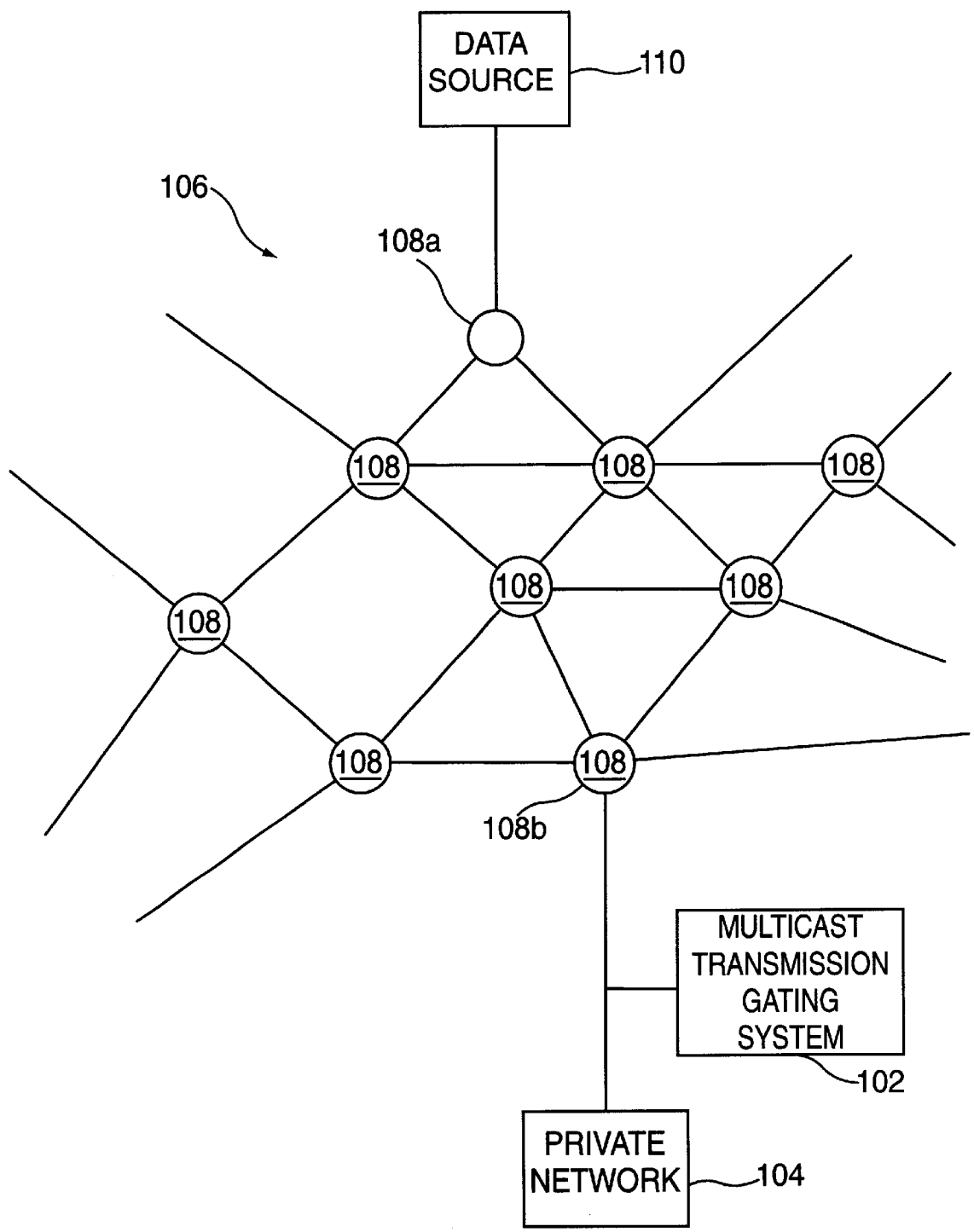
FIG. 3 shows a network diagram of a public network coupled to an exemplary multicast transmission gating system, according to the present invention.

An exemplary embodiment according to the present invention will now be described with reference to FIGS. 3–12. FIG. 3 depicts an exemplary multicast transmission gating system 102 used in conjunction with a private network 104 (e.g., a corporate intranet) and public network 106 (e.g., the Internet). Public network 106 comprises multiple interconnected nodes 108, only a portion of which are depicted in FIG. 3. Nodes 108 are implemented to include multicasting functionality, such that a multicast transmission may be replicated and routed to multiple end users. Nodes 108 include node 108a, which is connected to a data source 110, and node 108b, which is connected to private network 104.

Figure 4:
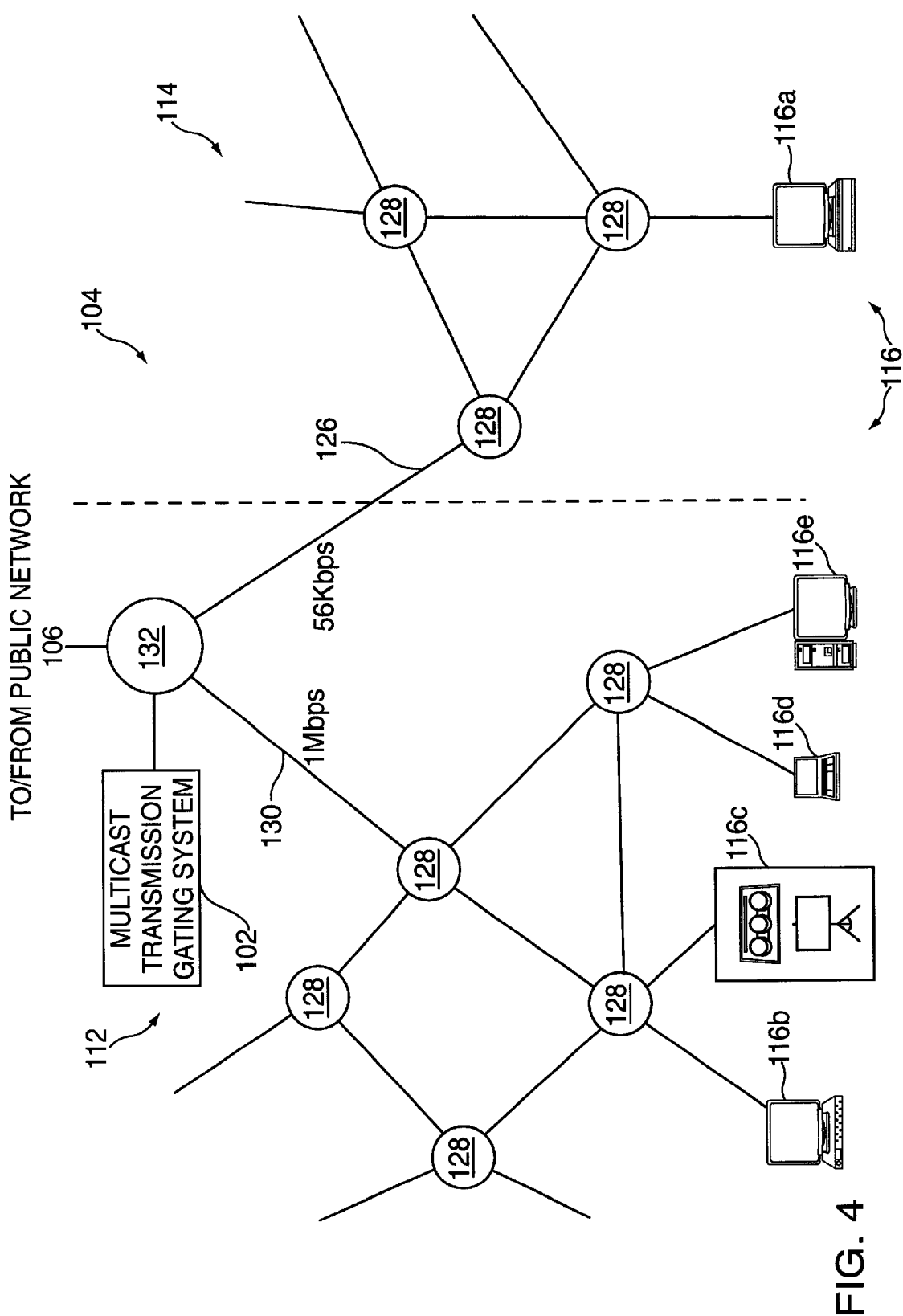
FIG. 4 shows a network diagram of an example of a private network coupled to the exemplary multicast transmission gating system, according to the present invention.

FIG. 4 shows a network diagram of exemplary private network 104. Note that private network 104 may be arranged in various topographies based on the type of equipment used and the location of the equipment; the topography of FIG. 4 (a corporate intranet) is useful to illustrate various features of the exemplary embodiment according to the present invention. As depicted in FIG. 4, exemplary private network 104 is spread over two corporate facilities 112, 114 (which are, for example, separate buildings). Connected to private network 104 are a number of network clients 116—desktops workstations, file servers, project of displays, and so forth. For purposes of example, five network clients 116a–116e are shown in FIG. 4. Exemplary private network 104 also includes private network nodes 128, which are included in private network 104, for example, for routing purposes. Network gateway node 132 connects the private network 104 to the public network 106, and allows transmissions to enter and exit private network 104. In the example shown by FIG. 4, network gateway node 132 is physically located at corporate facility 112, and the equipment of corporate facility 112 (e.g., clients 116b–116e) is interconnected with network gateway node 132 via a 1 Mbps (high bandwidth) connection 130. The equipment of corporate facility 114 (e.g., client 116a) is interconnected with the equipment of corporate facility 112 via a 56 Kbps (low bandwidth) data link 126 to network gateway 132.

Network clients 116 connected to private network 104 may comprise a multitude of different types of equipment. For example, network client 116a is a first desktop computer workstation, network client 116b is a second desktop computer workstation, network client 116c is a projection display system, network client 116d is a notebook computer, and client 116e is a high-speed graphics workstation. For purposes of the present example, the first desktop computer 116a has a high-end processing unit that enables it to process most compression formats in real-time, while the second desktop computer 116b has a low-end processing unit that is not capable of performing many types of decompression fast enough to allow real-time viewing. Projection display system 116c also uses a low-end processing unit that does not support viewing highly compressed transmissions. Notebook computer 116*d* does not support any type of real-time video transmissions. Graphics workstation 116*e* is capable of displaying all forms of real-time video and audio. Note that the clients 116*a*–116*e* are merely exemplary, and other types of equipment coupled to the private network 104 may also be used in conjunction with the exemplary embodiment according to the present invention. As will be further discussed below, the network "profile" depicted by FIG. 4 is useful to illustrate various transmission constraints that may be alleviated through the use of exemplary multicast transmission gating system 102.

According to the present invention, exemplary multicast transmission gating system 102 is provided as the access point (application layers gateway) for all multicast communication between the clients 116 connected to private network 104 and the multicast facilities of public network 106. Exemplary multicast gating system 102 may be implemented in various fashions: for example, as part of a dedicated network node "on-site" (e.g., at a corporate facility) with support for standard internet protocols, or as part of the facilities of an Internet service provider (ISP). As such, multicast gating system 102 may be implemented as part of the private network 104 or as an adjunct to the private network 104, with equivalent functional results. Multicast gating system 102 may be implemented to work with current MBONE multicasting facilities of the Internet, or with other multicasting facilities utilizing the Real Time Transfer Protocol (RTP) standard for multicast transmissions, as will be understood from the explanation given below.

Figure 5:
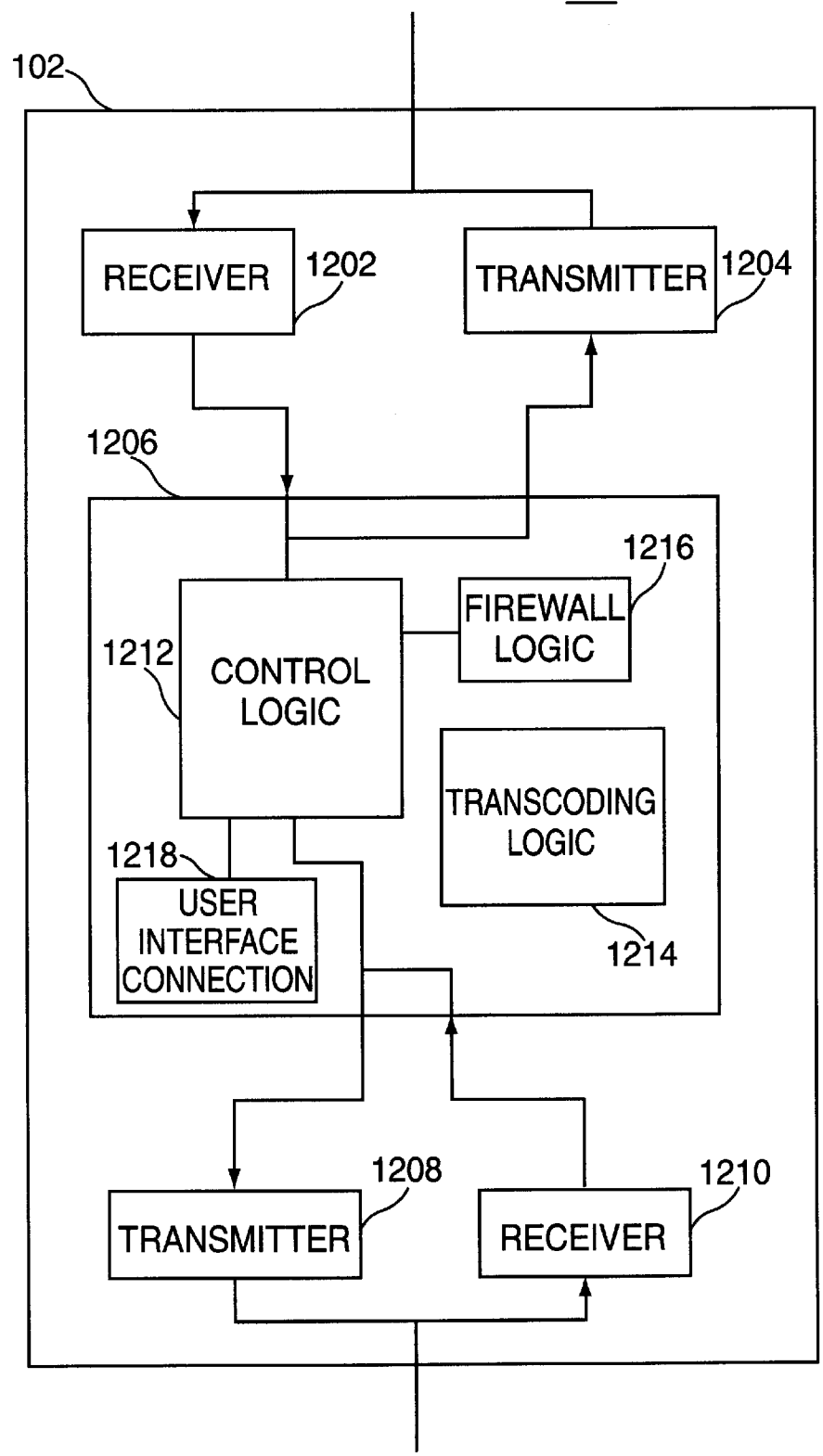
FIG. 5 shows a block diagram of the exemplary multicast transmission gating system of FIG. 3, according to the present invention.

FIG. 5 depicts a block diagram of the logical components of exemplary multicast transmission gating system 102 according to the present invention. Exemplary multicast gate 102 includes public network receiver 1202 and public network transmitter 1204, which provide an interface between the multicast gate 102 and the multicast facilities of the public network 106. Exemplary multicast gate 102 further includes private network receiver 1210 and private network transmitter 1208, which provide an interface between the multicast gate 102 and the private network 104 (and, therefore, clients 116 connected to the private network 104).

Exemplary multicast transmission gating system 102 further includes gating controller 1206 which provides the various capabilities of the gating system. For example, gating controller 1206 may include transcoding logic 1214 to perform transcoding of multicast transmissions received from the public network 106 into multicast transmissions of various other encoding formats, as will be further described below. Gating controller 1206 also may include control logic 1212 to perform access control and filtering of multicast transmissions received from the public network 106, such that only a certain subset of clients 116 receive the multicast group, as further described below. Gating controller 1206 may also contain firewall logic 1216 to provide security from unauthorized attempts to access the private network 104 via the multicast facilities of the public network 106.

Gating controller 1206 may also contain a user interface connection 1218, which allows, for example, a system administrator, to access various and features of the multicast transmission gating system 102 (e.g., network profile, transmission, available transcoding formats, and so forth). This user interface connection 1218 may take the form of a direct terminal connector (e.g., a browser a menu-based interface), a connection via the facilities of private network 104, or another well known user interfacing scenario.

In operation, multicast gate 102 receives transmissions, for example, in RTP format, sent over the public network 106. Multicast gate 102 can be configured to receive and process any number of multicast groups, and thus may be used to enable or disable access to various multicast groups by private network clients 116. For example, it may be considered undesirable to allow transmission of entertainment multicasts over the corporate network (as a waste of system bandwidth, etc.), in which case the gate 102 may be configured to disable all access to such multicast groups. As another example, it may be desired to only allow access to certain high bandwidth transmissions once a more senior user has requested such transmissions, in which case multicast gate 102 may be configured to disable access to such multicast groups until certain authorized clients 116 have made such a request. Such configuration may be accomplished, for example, by a system administrator who may access the multicast gating system 102 (via user interface 1218) to set transmission filters within the multicast gate 102.

Furthermore, it may be desirable to limit access to certain multicast transmissions by certain network clients 116 due to bandwidth constraints or due to the processing limitations of particular clients 116. Certain multicast transmissions may require more bandwidth than certain network equipment can provide or more compression than certain clients 116 can process in real-time. For example, a 60 Kbps multicast transmission would not be receivable by client 116*a* in FIG. 4, because the 56 Kbps data link 126 limits the bandwidth available to incoming transmissions. Accordingly, multicast gating system gate 102 may be programmed with the profile of the network configuration and client performance characteristics of the private network 104 and configured to prevent such high bandwidth multicast groups from being received at client 116*a*. This feature of multicast gate 102 also allows control of bandwidth resources of the private network 104, such that individual clients 116 will not overuse network bandwidth by receiving certain multicast groups.

For those multicast groups where access is permitted, multicast gate 102 may then employ transcoding features to provide multicast "sub-groups" for private network 104 that allow equipment with the varying reception capabilities connected to the private network 104 to access the multicast group being transmitted. The multicast gate 102 generates and provides Session Description Protocol (SDP) messages over the private network 104 advertising the content of each multicast sub-group. Individual network clients 116 may then subscribe to receive transmissions from a particular multicast sub-group by, for example, providing Real Time transfer Control Protocol (RTCP) message to the multicast gate 102. If the multicast gate 102 is already providing this multicast sub-group transmission to other clients 116 on the private network 104, then the subscription request results in approximately instantaneous connection to the multicast transmission.

Figure 6:
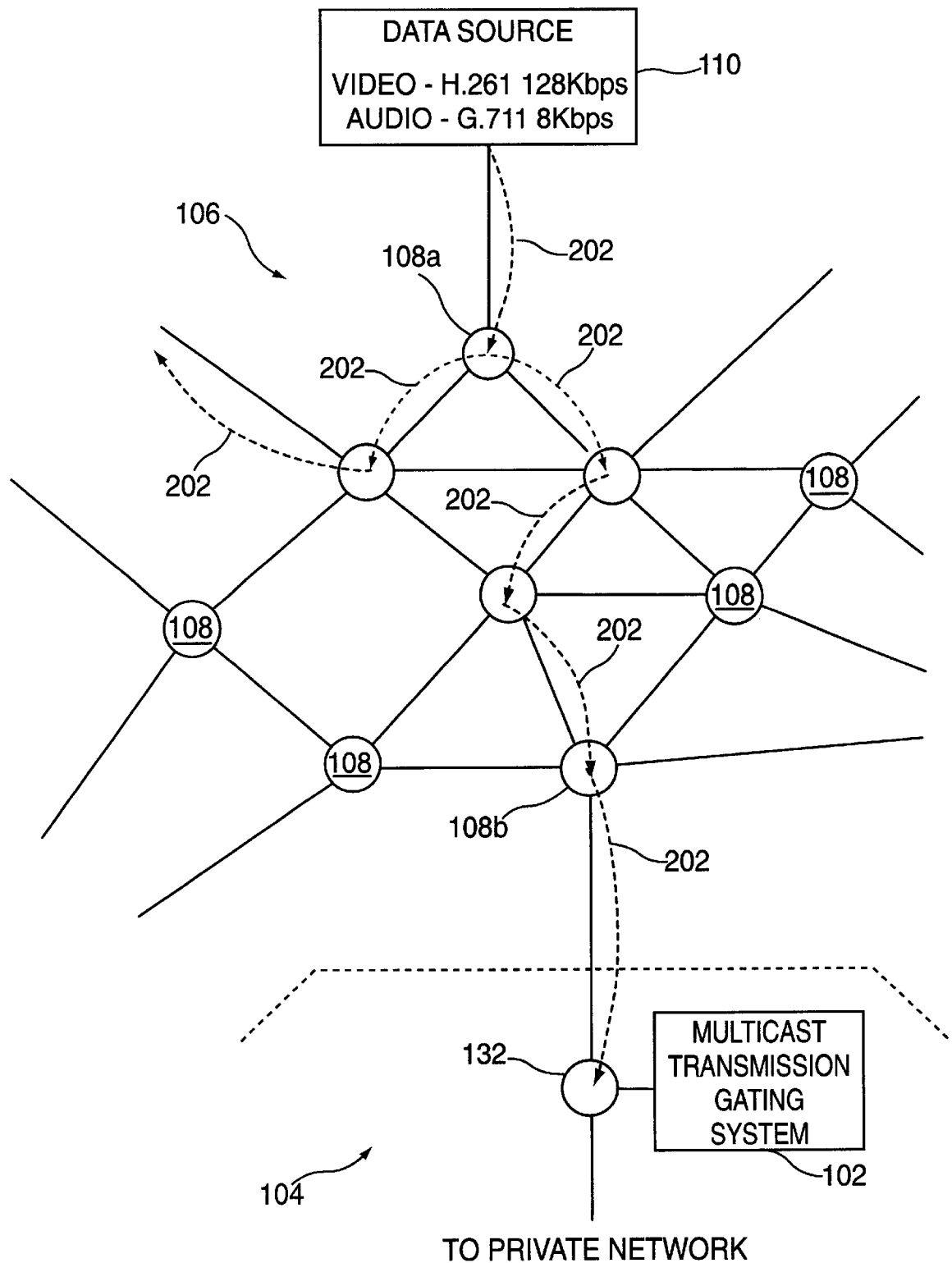
FIG. 6 shows a network diagram of an exemplary multicast transmission over the public network of FIG. 3 to the exemplary multicast gating system, according to the present invention.

The operation of the exemplary multicast transmission gating system 102 may be further explained using the following example of a hypothetical multicast group transmission being transmitted by data source 110 over public network 106 to multicast transmission gating system 102 and private network 104. FIG. 6 illustrates a transmission of the hypothetical multicast group (called "XYZ") over the public network 106. Data source 110 generates a multicast transmission comprising a video and audio data stream that represents the information content of the multicast group. The video data stream is provided as digitized video according to compression standard H.261, resulting in a signal bandwidth of approximately 128 Kbps. The audio data stream is provided as digitized audio according to compression standard G.711, resulting in a signal bandwidth of approximately 8 Kbps. Both the H.261 and G.711 compression standards are well known in the art.

According to the operation of the multicast facility of public network 106, the multicast transmission is received at node 108a, replicated and routed to those network nodes 108 that serve end-users that have subscribed to receive the multicast transmission. A hypothetical transmission path is illustrated in FIG. 6 by the transmission vectors 202. As the multicast transmission gating system 102 has subscribed to receive the multicast group XYZ, the transmission path for the multicast transmission of group XYZ includes node 108b, which routes the multicast transmission to private network node 132 of private network 104. Private network node 132 recognizes the transmission as a multicast transmission and transmits the data to multicast gate 102 serving private network 104.

Figure 7:
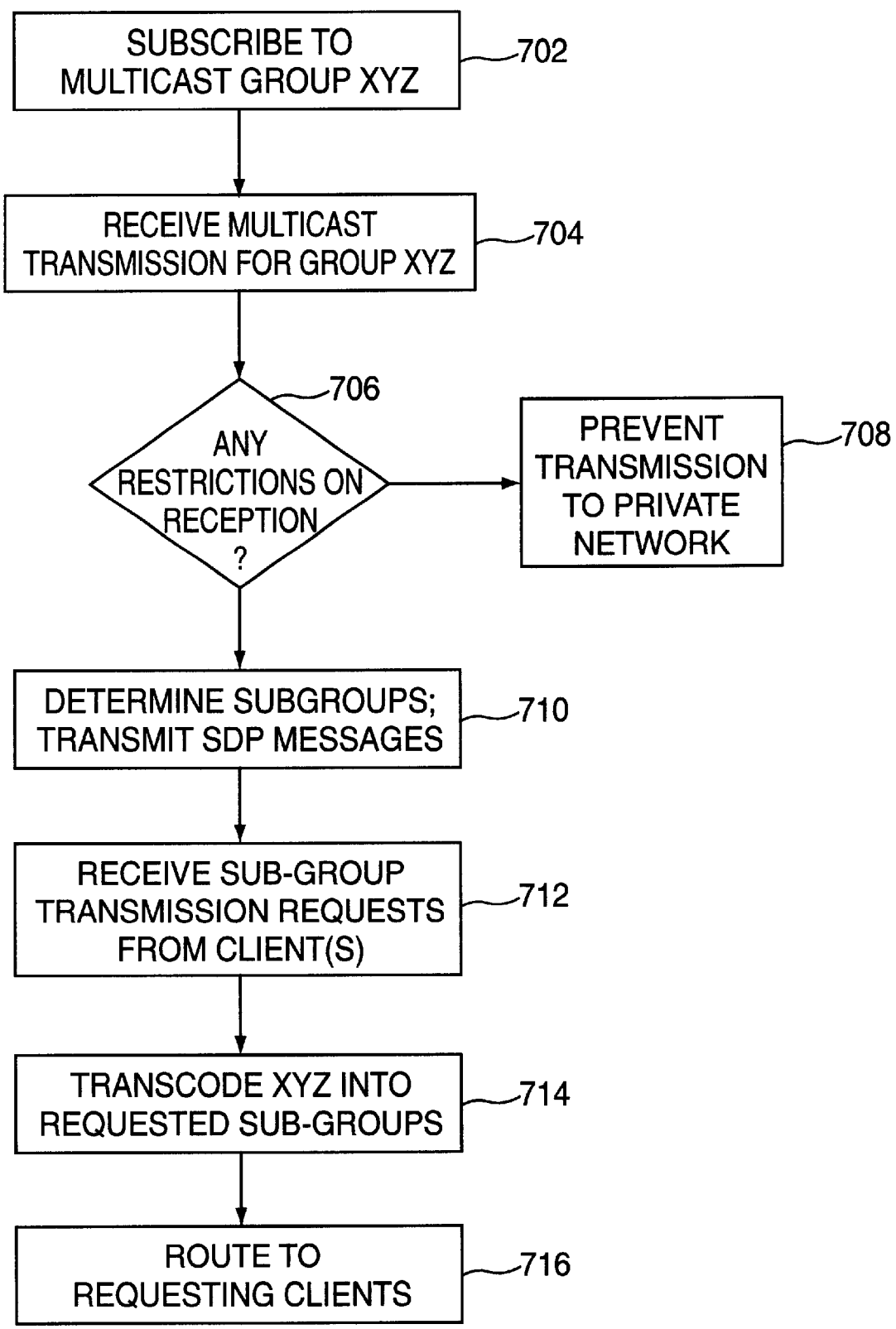
FIG. 7 shows a flow chart of operation of the exemplary multicast gating system, accordingly to the present invention.

FIG. 7 depicts a flow chart of the operation of exemplary multicast transmission gating system 102 according to the XYZ example. Multicast gate 102 initially subscribes to receive multicast group XYZ (step 702), for example, by having an IGMP join message sent to the public network 106. Multicast gate 102 receives the transmission of multicast group XYZ once the data source 110 (see FIG. 6) begins multicasting (step 704). Upon receipt of the multicast transmission for group XYZ, multicast gate 102 checks to see if there is any restriction on the reception of this multicast group by the clients 116 of private network 104 (step 706). If access to this multicast group XYZ has been disabled, the multicast transmission will not be made available to those clients 116 of the private network 104 that are prohibited from receiving the transmission (step 710).

The multicast gate 102 determines whether a transcoding function should be applied to the XYZ transmission in order to allow real-time reception of the transmission content by various types of equipment of the private network 104 (step 708). This determination can be based on the network profile of the private network 104 and the transcoding capabilities of multicast gate 102. For example, multicast group XYZ is transmitted originally with a digitized video signal in H.261 format and a digitized audio signal in G.711 format. Multicast gate 102 is configured in this example to transcode this transmission into four multicast sub-groups: "XYZ-1", using video format H.263 and audio format G.723; "XYZ-2", using video format IVI 4.2 and audio format G.711; "XYZ-3", using only audio format G.711; and "XYZ-4", using the MPEG video format and the G.729 audio format. Each of these video and audio compression formats is well known. These four multicast sub-groups allow each of the clients 116 to access the content of multicast group XYZ in a format which is receivable by individual clients 116 and will not degrade operation of private network 104. Note that multicast gate 102 may provide more or fewer sub-groups as necessitated by the types of equipment present on the private network 104 (as reflected by the network profile), and as is within the processing capabilities of the multicast gate 102. Also, if the profile of private network 104 does not indicate the need for alternate format transmissions, multicast gate 102 may pass the original format transmissions through to clients 116 without transcoding.

Multicast gate 102 generates and distributes SDP messages advertising the different multicast sub-groups available over the private network 104. If multicast gate 102 is aware of the particular equipment and/or network connections of private network 104, multicast gate 102 can tailor the SDP message transmissions to only send messages to each client 116 for those sub-groups which are receivable by the particular client. For example, since notebook computer client 116d cannot receive real-time video data, multicast gate 102 may be configured to disable SDP messages for sub-groups XYZ-1, XYZ-2 and XYZ-4, which provide video data. As SDP messages are minimal bandwidth transmissions, all network clients 116 may receive such transmissions without causing network congestion.

Network clients 116 may then initiate reception of the content being sent in particular multicast sub-groups by requesting transmission, or "tuning," to the desired sub-group (step 712). The "tuning" activity for the example of an RTP format transmission (further described below) causes the generation of an initial RTCP message to multicast gate 102 indicating the multicast sub-group to be received. Upon receipt of the RTCP message, multicast gate 102 begins transcoding of the XYZ group into the requested sub-group (step 714). The transcoded sub-group is then transmitted to the requesting client 116 via the private network 104 (step 716).

Figure 8:
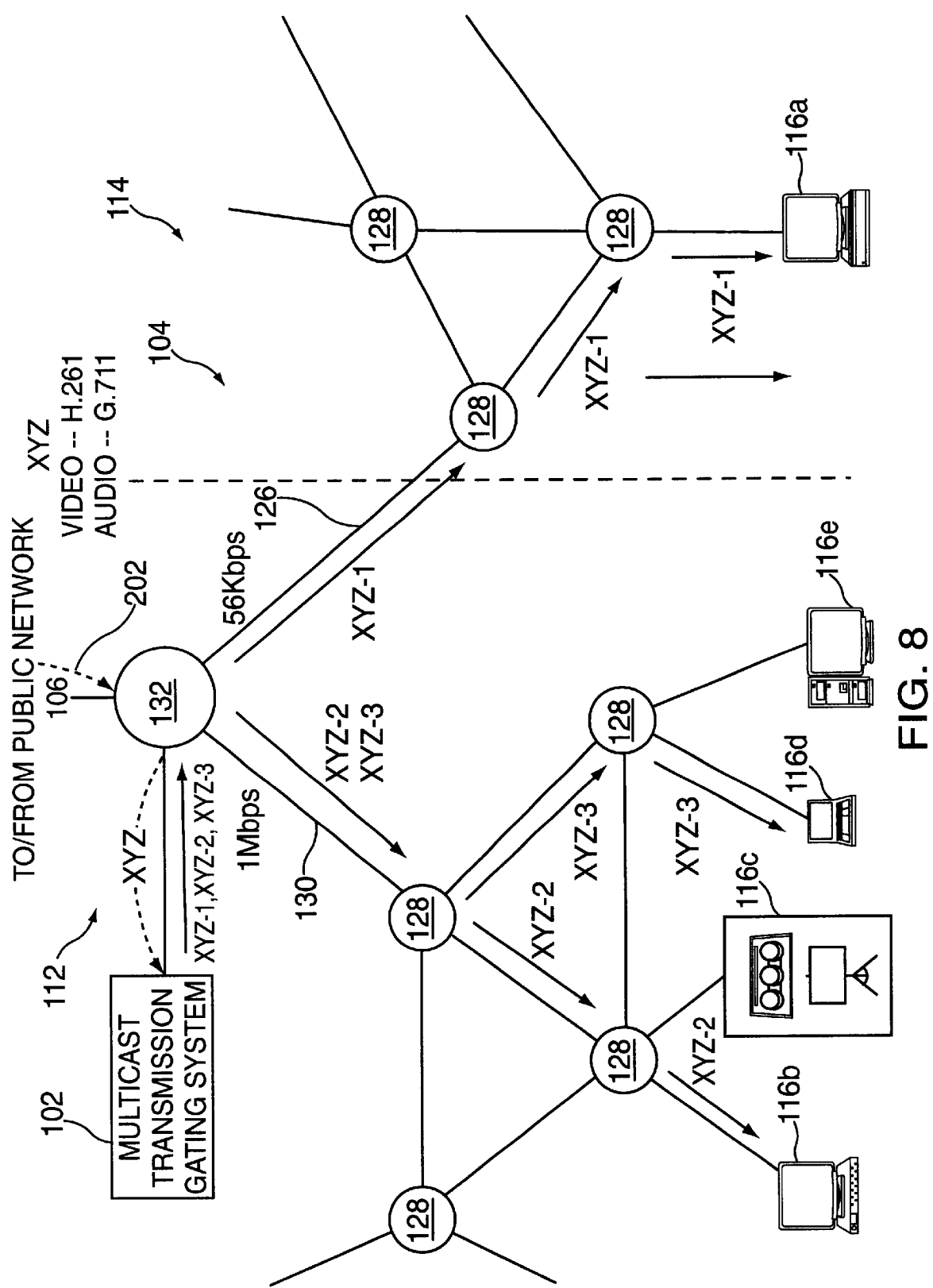
FIG. 8 shows a network diagram of multicast sub-group transmissions over the private network of FIG. 4 from the exemplary multicast gating system, according to the present invention.

FIG. 8 illustrates the reception of multicast sub-groups by clients 116a, 116b and 116d. Client 116a has requested receipt of multicast sub-group XYZ-1, and multicast gate 102 has transcoded the XYZ transmissions into the format of the XYZ-1 sub-group. The XYZ-1 sub-group is then routed from node 132 over the 56 Kbps data link 126 to the network equipment in corporate facility 114, and then further routed by private network nodes 128 to client 116a. Note that client 116a is a desktop workstation that is powerful enough to handle most types of compression, and therefore the sub-group XYZ-1, which provides a more compressed signal, is an appropriate choice to save bandwidth and allow the multicast group XYZ to be accessed via low bandwidth data link 126.

Client 116b has requested reception of multicast sub-group XYZ-2, which is likewise transcoded by multicast gate 102 and then transmitted via node 132 over the 1 Mbps data link 130 to the network equipment of corporate facility 112, where it is routed by private network nodes 128 to client 116b. Sub-group XYZ-2 provides a less compressed signal than sub-group XYZ-1 (which can be handled in real-time by low power desktop computer 116b), and the associated higher bandwidth is handled by high bandwidth data link 130.

Client 116d has requested receipt of multicast group XYZ-3, which is transcoded by multicast gate 102 and transmitted from node 132 over 1 Mbps data link 130 to the network equipment of corporate facility 112, and routed by private network nodes 128 to the client 116d. Since client 116d is a computer that cannot receive real-time video, sub-group XYZ-3 (which provides only audio data) is the proper transmission format. In the above-described manner, network clients 116a, 116b and 116d may receive the content being sent by multicast group XYZ in a format which allows each client to access such content in real-time according to the constraints of the network and client equipment.

Figure 9:
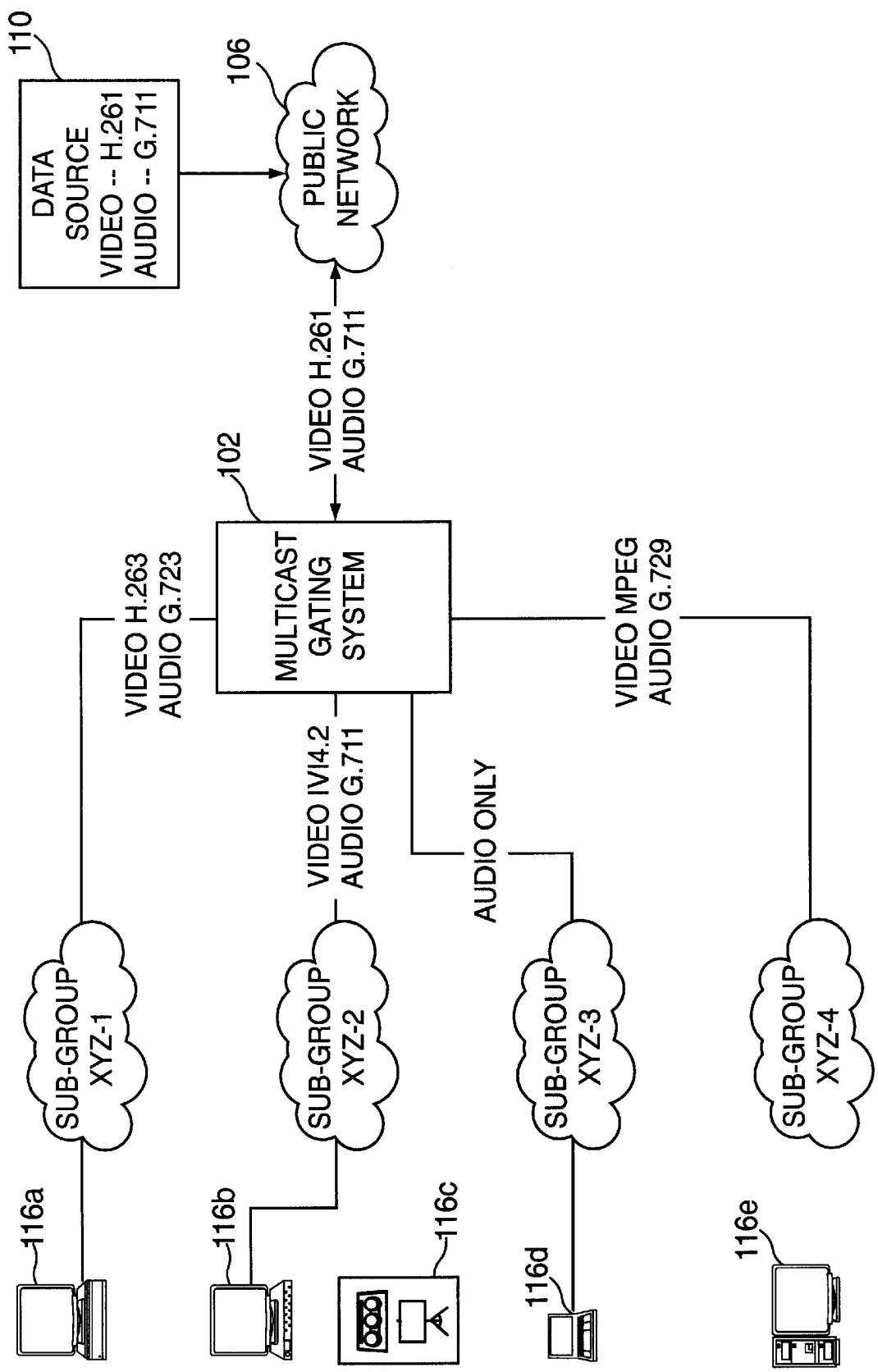
FIG. 9 shows a logical block diagram of the exemplary multicast sub-group transmissions over the private network of FIG. 6.

FIG. 9 shows a diagram of the logical connections of various multicast sub-groups produced by the exemplary multicast transmission gating system 102 for the multicast group XYZ. As described previously for FIG. 6, multicast group XYZ is transmitted from data source 110 to multicast gate 102 via public network 106. Multicast group XYZ is originally transmitted as a digitizes video signal in H.261 format and a digitized audio signal in G.711 format. Multicast gate 102 is configured to transcode this group into the four sub-groups XYZ-1, XYZ-2, XYZ-3 and XYZ-4. As described for FIG. 8, client 116a has requested receipt of sub-group XYZ-1, client 116b has requested receipt of sub-group XYZ-2, and client 116d has requested receipt of sub-group XYZ-3. Clients 116c and 116e have not (as yet) requested reception of any sub-groups, and no clients have requested reception of sub-group XYZ-4 (although multicast gate 102 is providing SDP messages for sub-group XYZ-4). Where no clients have requested a particular available sub-group, exemplary multicast gate 102 does not perform the transcoding needed to generate the transmissions for that sub-group. Thus, in FIG. 9, while sub-group XYZ-4 is available should a client 116 desire to receive it, multicast gate 102 has not yet generated transmissions for this sub-group.

Figure 10:
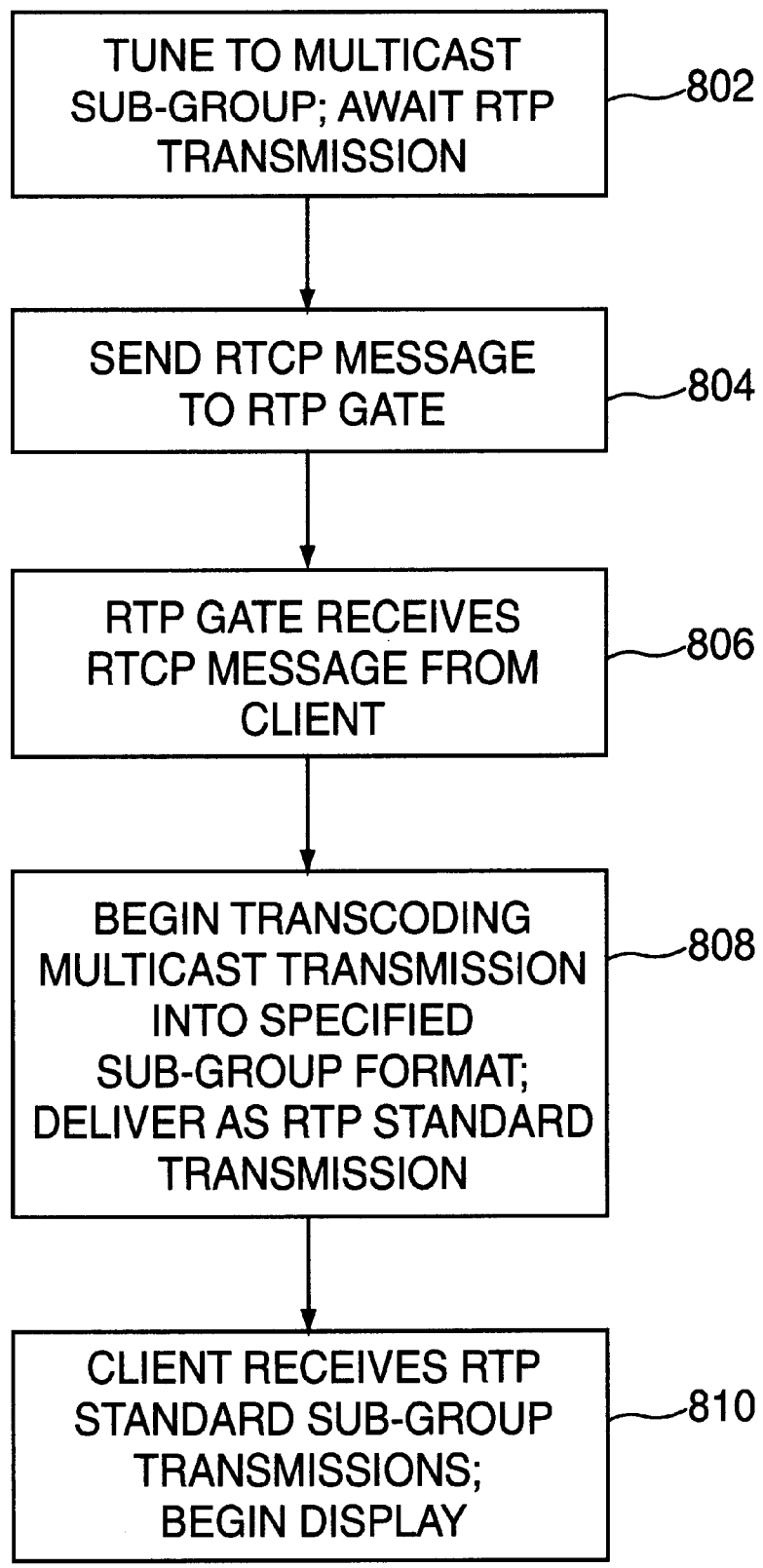
FIG. 10 shows a flow chart of an exemplary method for connecting a client to a new multicast sub-group, according to the present invention.

To further illustrate the operation of exemplary multicast transmissions gating system 102, FIG. 10 is a flow chart of an exemplary process by which client 116e joins multicast sub-group XYZ-4. In step 802, client 116e "tunes" to multicast sub-group XYZ-4, expecting to receive the content advertised by the SDP messages for sub-group XYZ-4. "Tuning" occurs when client 116e indicates a desire to receive a multicast transmission, for example, by sending an IGMP join message to its nearest node 128 indicating that the multicast transmission should be routed to client 116e. This node 128 may then begin routing the transmission of multicast sub-group XYZ-4 to client 116e (once it has been generated by the multicast gate 102). According to the RTP standard, client 116e then awaits receipt of RTP formatted data for real-time processing at the location specified by the SDP message. Also, client 116e, according to the RTP standard, begins sending RTCP messages to the multicast gate 102 (step 804). RTCP messages are sent more infrequently than RTP messages, and therefore there may be a delay between the time when the client 116e tunes to the multicast sub-group and the time when the first RTCP message is generated by client 116e.

Upon receipt of the RTCP message from client 116e (step 806), the multicast transmission gating system 102 begins transcoding of multicast group XYZ to generate the transmissions for sub-group XYZ-4 in the specified alternate format—MPEG video and G.729 audio (step 808). The transmissions for sub-group XYZ-4 are in the RTP standard, and are transmitted via node 1 32 and private network nodes 128 to client 116c. Client 116e receives and processes the data for real-time display of the content of multicast group XYZ (step 810). Since client 116e is a graphics workstation with a high bandwidth connection, client 116e can properly receive the high bandwidth signal being sent over sub-group XYZ-4.

Figure 11:
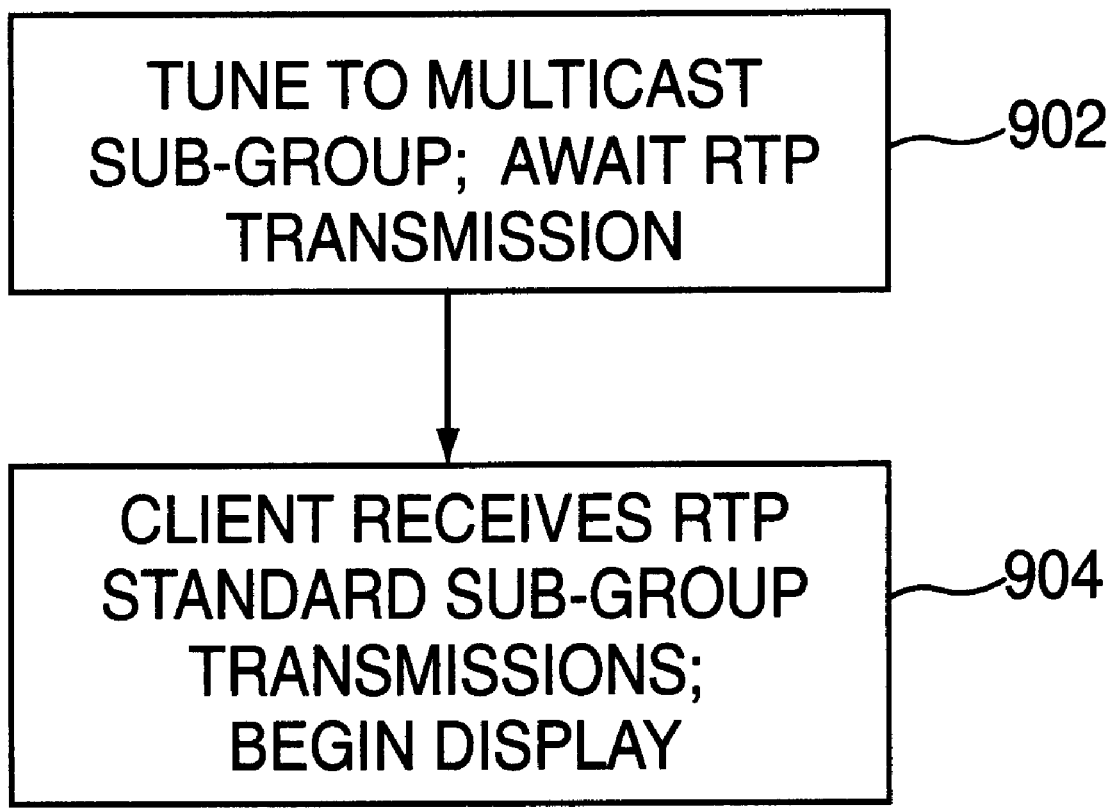
FIG. 11 shows a flow chart of an exemplary method for connecting a client to a pre-existing multicast sub-group, according to the present invention.

To further illustrate the operation of exemplary multicast gate 102, FIG. 11 is a flow chart of the process by which client 116c joins multicast sub-group XYZ-2. Note that sub-group XYZ-2 is already being generated by multicast gate 102 for reception by client 116b. In step 902, client 116c "tunes" to multicast sub-group XYZ-2, expecting to receive the content advertised by the SDP messages for sub-group XYZ-2. Client 116c, according to the RTP standard, awaits receipt of RTP formatted data for real-time processing. Since sub-group XYZ-2 is already being provided to client 116b, multicast gate 102 is already transcoding the multicast transmission into the specified format for sub-group XYZ-2. Thus reception of RTP standard transmissions for sub-group XYZ-2 by client 116c begins immediately after client 116c tunes to sub-group XYZ-2, without waiting for the sending of an RTCP message by client 116c (step 904).

Figure 12:
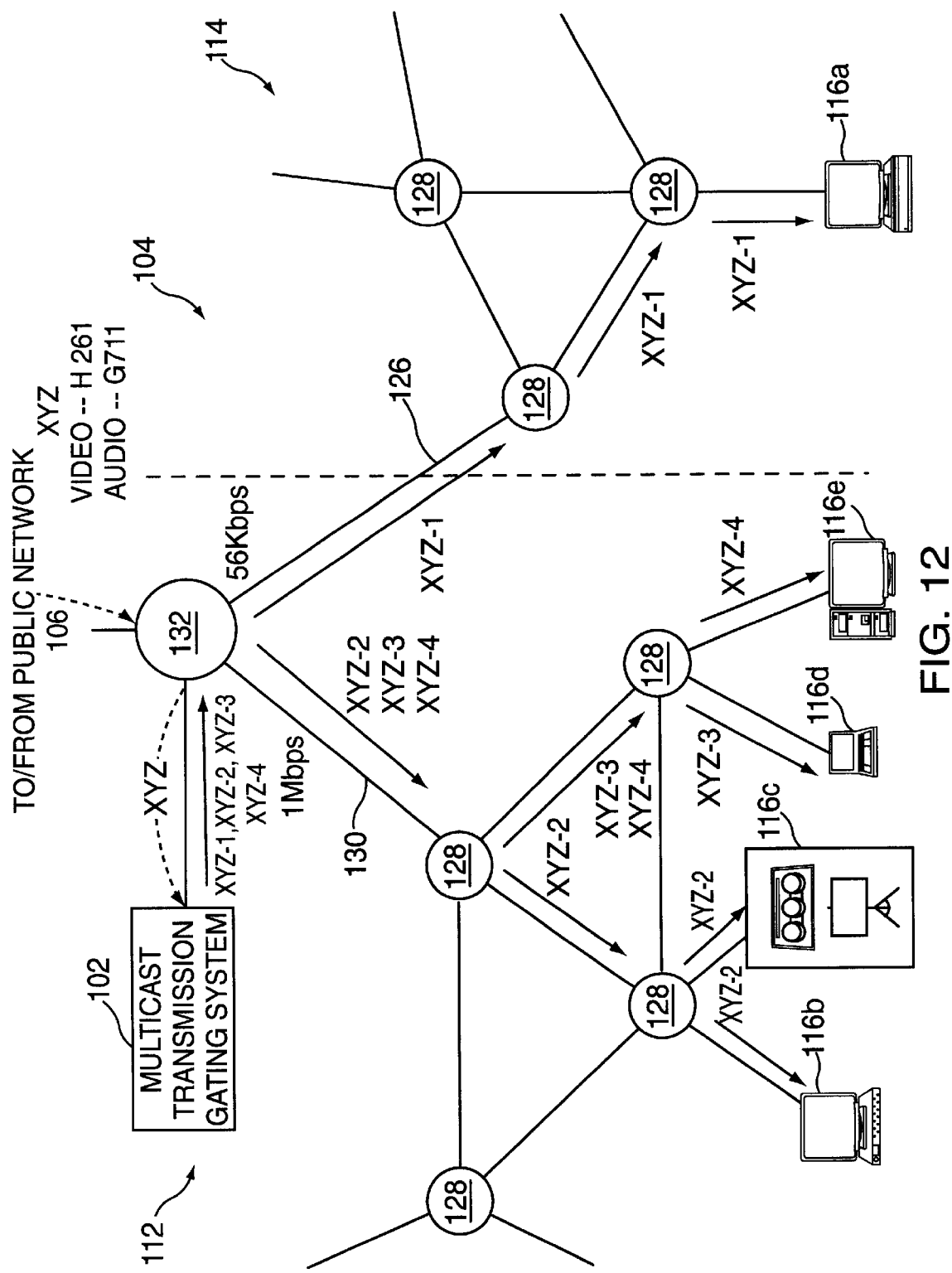
FIG. 12 shows a second network diagram of multicast sub-group transmissions, according to the present invention.
Figure 13:
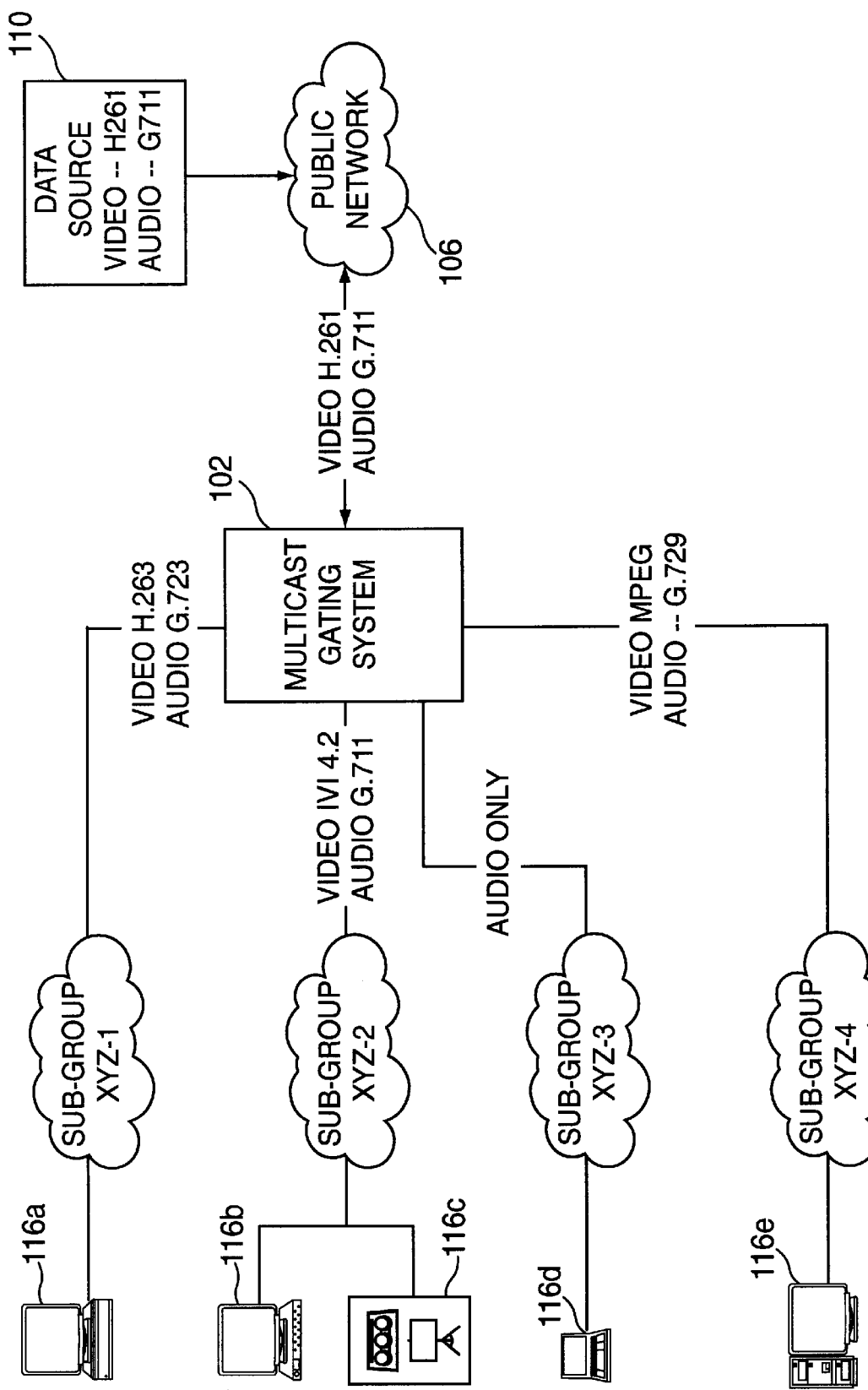
FIG. 13 shows a logical block diagram of the exemplary multicast sub-group transmissions over the private network of FIG. 10.

FIG. 12 shows a network diagram of the private network 104 subsequent to the subscription of clients 116c and 116e to multicast sub-groups as described above. FIG. 12 is similar to FIG. 8, with the addition of a transmission path that provides sub-group XYZ-2 to client 116c, and a transmission path that provides sub-group XYZ-4 to client 116e. FIG. 13 shows a logical connection diagram (similar to FIG. 9) that reflects these connections.

Multicast transmission gating system 102 may include features in addition to the features described above. For example, multicast gate 102 may include a firewall feature that allows regulation of access to private network 106, in order to prevent security breaches via the link to public network 106. (See FIG. 5—firewall logic 1216.) As multicast gate 102 is the only access point to the private network 104 from the public network 106 for multicast transmissions, a network firewall (such as those already well known) will serve to insulate the private network 104 from unauthorized accesses to the facilities of the private network 104.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A multicast transmission gating system, comprising:
a first network receiver to receive a multicast transmission in a predetermined coding format from a first network;
control logic to determine a plurality of alternate coding formats for a plurality of respective alternate format transmissions;
a transcoder to generate an alternate format transmission from the plurality of alternate format transmissions by converting the multicast transmission from the predetermined coding format into a respective alternate coding format from the plurality of alternate coding formats; and
a second network transmitter to transmit the alternate format transmission to a second network.

2. The system of claim 1, wherein the control logic includes logic to control transmission of the alternate format transmission to at least one client connected to the second network.

3. The system of claim 2, wherein the control logic uses a profile of the second network to control the transmission of the alternate format transmission to the at least one client.

4. The system of claim 3, wherein the profile of the second network includes network bandwidth characteristics and client performance characteristics of the second network.

5. The system of claim 4, wherein the client performance characteristics include an indication of processing power of the at least one client.

6. The system of claim 1, wherein the control logic determines the alternate coding format of the alternate format transmission based on a profile of the second network.

7. The system of claim 6, wherein the control logic includes logic to control transmission of the alternate format transmission to at least one client connected to the second network.

8. The system of claim 7, wherein the control logic uses the profile of the second network to control the transmission of the alternate format transmission to the at least one client.

9. The system of claim 8, wherein the control logic includes logic to generate a description message for the alternate format transmission and transmit the description message to the second network.

10. The system of claim 9, wherein the description message is a Session Description Protocol (SDP) message.

11. The system of claim 1, further comprising a second network receiver to receive a client message from at least one client connected to the second network, and wherein the control logic includes logic to allow the second network transmitter to transmit the alternate format transmission upon receipt of the client message.

12. The system of claim 11, wherein the control logic includes logic to allow the transcoder to begin generation of the alternate format transmission when the client message is received.

13. The system of claim 11, wherein the client message is a Real Time Transport Control Protocol (RTCP) message.

14. The system of claim 1, further comprising firewall logic to prevent unauthorized access to the second network.

15. The system of claim 1, wherein the multicast transmission is of a multicast group, and the multicast group includes real-time multicast data.

16. The system of claim 1, wherein the multicast transmission comprises a Real Time Transport Protocol (RTP) message.

17. The system of claim 1, wherein the first network is the Internet and the second network is a private network.

18. The system of claim 17, wherein the private network comprises an intranet.

19. The system of claim 1 wherein the predetermined coding format and alternate coding format are compression encoding formats.

20. A multicast transmission gating system, comprising:
a first network receiver to receive a multicast transmission in a predetermined coding format from a first network;
control logic to determine a number of alternate coding formats, based on reception capabilities of a number of clients connected to a second network;
a transcoder to generate a number of alternate format transmissions by converting the multicast transmission from the predetermined coding format into each of the number of alternate coding formats;
a second network receiver to allow reception of a subscription request from at least one client from the number of clients connected to the second network; and
a second network transmitter to allow transmission of each of the number of alternate format transmissions to the at least one client when the subscription requests is received.

21. The system of claim 20, wherein the control logic includes logic to control the transcoder to generate a specific alternate format transmission from the number of alternate format transmissions when the specific alternate format transmission is requested by the at least one client via the subscription request.

22. A method of processing multicast data, comprising the steps of:
receiving a multicast group via a multicast transmission in a predetermined coding format from a first network;
determining a plurality of alternate coding formats for a plurality of respective alternate format transmissions based on a profile of a second network;
generating an alternate format transmission from the plurality of alternate format transmissions by converting the multicast transmission from the predetermined coding format into a respective alternate coding format from the plurality of alternate format coding formats;
transmitting the alternate format transmission to a client connected to the second network that has subscribed to receive the alternate format transmission.

23. The method of claim 22, wherein the profile of the second network includes network bandwidth characteristics and client performance characteristics, and wherein the alternate coding format is determined using the profile to allow reception of the multicast group by the client via the second network.

24. The method of claim 22, further comprising the steps of:
receiving from the client a client subscription message indicating a desire to receive the alternate format transmission;
transmitting the alternate format transmission to the client after receiving the client subscription message.

25. The method of claim 24, wherein the client subscription message is a Real Time Transport Control Protocol (RTCP) message.

26. The method of claim 24, further comprising the step of:
generating the alternate format transmission after receiving the client subscription message.

27. The method of claim 22, further comprising the steps of:
generating a description message for the alternate format transmission; and
transmitting the description message to the client.

28. The method of claim 27, wherein the description message is a Session Description Protocol (SDP) message.

29. The method of claim 22, further comprising the step of:
preventing access by the client to the multicast group based upon the profile of the second network.

30. The method of claim 29, wherein the profile of the second network includes at least one transmission filter.

31. The method of claim 22, further comprising the step of:
performing a firewall security operation to prevent unauthorized transmissions from entering the second network.

32. The method of claim 22, wherein the multicast transmission comprises real-time multicast data.

33. The method of claim 22, wherein the multicast transmission is a Real Time Transport Protocol (RTP) message.

34. The method of claim 22, wherein the first network is the Internet and the second network is a private network.

35. A multicast transmission gating system, comprising:
a first network receiver to receive a transmission of a multicast group in a predetermined format from a first network;
control logic to prevent access to the multicast group by a client connected to a second network based on a profile of the second network, and to determine an alternate format based on the profile of the second network;
a transcoder to generate an alternate format transmission of a multicast sub-group by converting the transmission of the multicast group from the predetermined format into the alternate format;
a second network receiver to receive a subscription message for the multicast group from a client connected to the second network; and
a second network transmitter to transmit the alternate format transmission of the multicast sub-group to the client after the subscription message has been received.

36. A method of processing multicast data, comprising the steps of:
receiving a multicast group via a multicast transmission in a predetermined coding format transmitted over a first network;

determining a plurality of alternate coding formats for a plurality of respective alternate format transmissions based on a profile of a second network;

generating an alternate format transmission from the plurality of alternate format transmissions by converting the multicast transmission from the predetermined coding format into a respective alternate coding format from the plurality of alternate coding formats;

transmitting the alternate format transmission to a client connected to the second network that has subscribed to receive the multicast group.

* * * * *